No. 835,378. PATENTED NOV. 6, 1906.
G. H. TAYLOR.
CANOPY FOR HORSES.
APPLICATION FILED MAY 14, 1906.

2 SHEETS—SHEET 1.

Witnesses
G. R. Thomas
F. B. MacNab

Inventor
G. H. Taylor
By Chandler & Chandler
Attorneys

THE NORRIS PETERS CO., WASHINGTON, D. C.

No. 835,378. PATENTED NOV. 6, 1906.
G. H. TAYLOR.
CANOPY FOR HORSES.
APPLICATION FILED MAY 14, 1906.
2 SHEETS—SHEET 2.
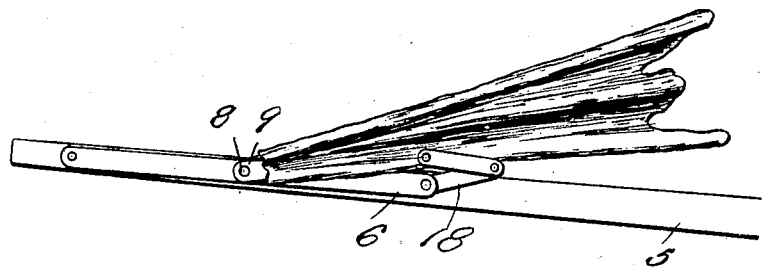
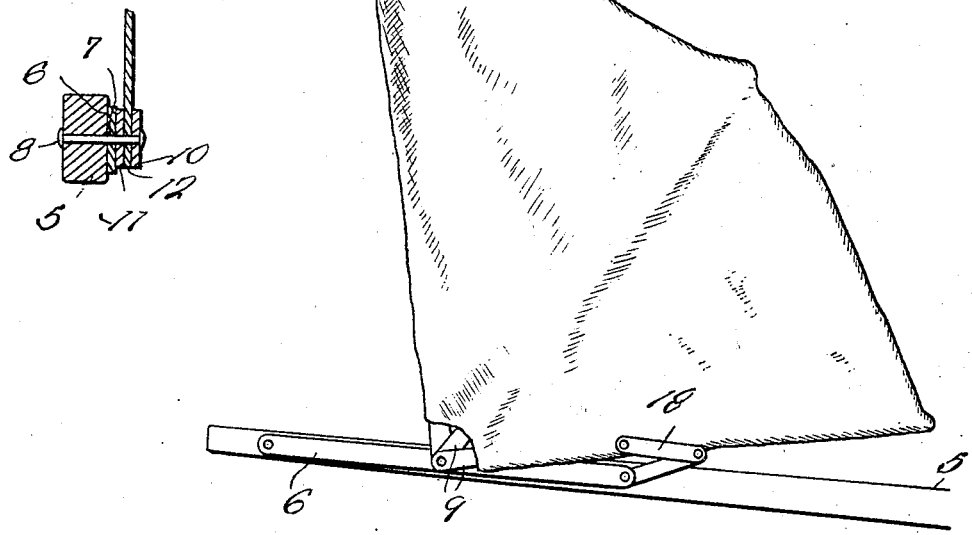

UNITED STATES PATENT OFFICE.

GEORGE H. TAYLOR, OF NEW ORLEANS, LOUISIANA.

CANOPY FOR HORSES.

No. 835,378.　　　Specification of Letters Patent.　　　Patented Nov. 6, 1906.

Application filed May 14, 1906. Serial No. 316,822.

*To all whom it may concern:*

Be it known that I, GEORGE H. TAYLOR, a citizen of the United States, residing at New Orleans, in the parish of Orleans, State of Louisiana, have invented certain new and useful Improvements in Canopies for Horses; and I do hereby declare the following to be a full, clear, and exact description of the invention, such as will enable others skilled in the art to which it appertains to make and use the same.

This invention has relation to canopies for covering a horse hitched between shafts to protect the animal from the hot rays of the sun.

It is the object of the invention to provide a simply-constructed, efficient, and readily-operated canopy for the purpose specified.

The invention consists of a canopy supported on three bows spread at the top to an extent that will reach over the horse's head and extend back as far as or over his tail. The said bows converge at the shafts on each side and are there pivoted on a supporting-iron extending for some distance along the shafts on a line preferably outside, where they will be out of the way of the traces and other parts of the harness. Means are provided for keeping the canopy from pitching forward over the head of the horse and from folding back without intention. Jointed metallic straps in the nature of toggle-levers are connected with the bows on the inside slightly above their converging-point to effect the spreading or stretching of the bows and for folding them together and letting them down behind the horse when desired.

The invention will first be described in detail in connection with the annexed drawings, forming a part of this specification, and then be pointed out with particularity in the subjoined claims.

It will of course be understood that the present invention is of equal value as a protector against both rain and sun.

Figure 1:
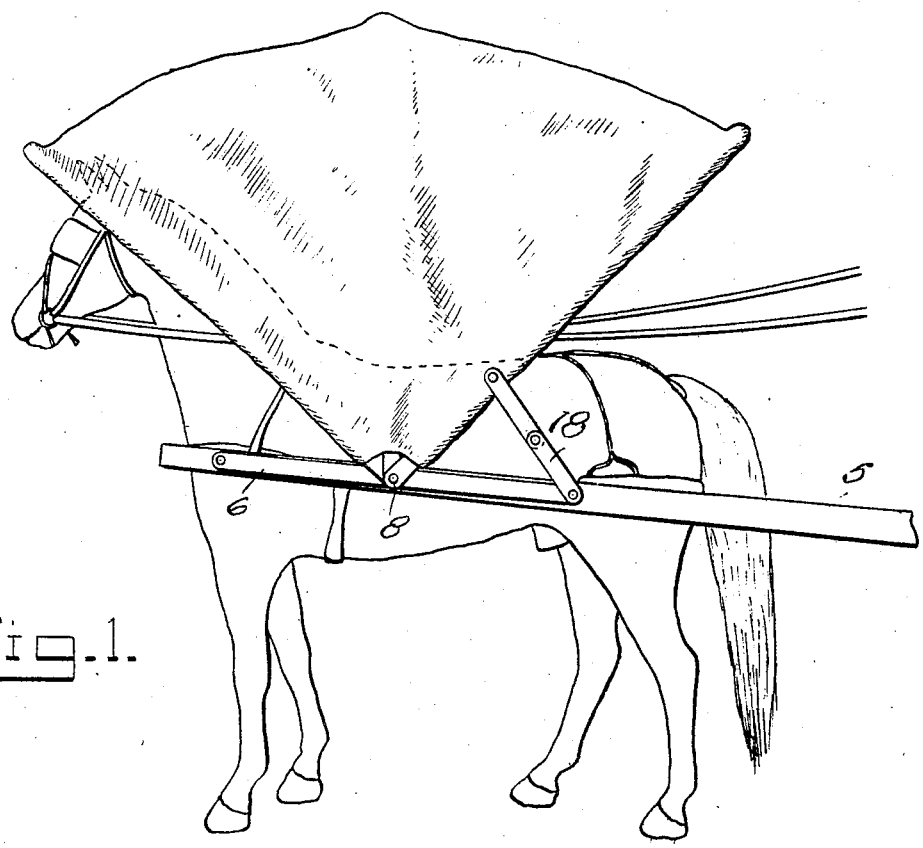
Figure 2:
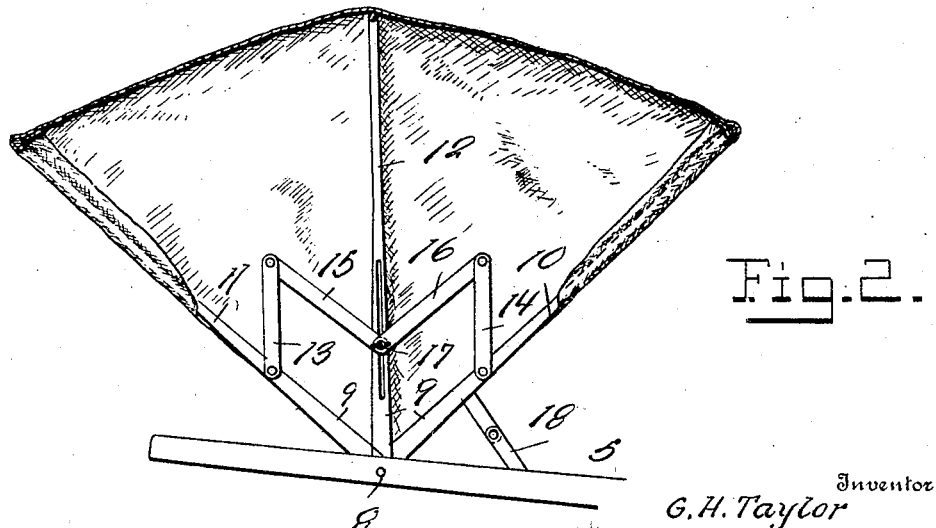

Of the said drawings, Figure 1 is a side view of the invention in place over a horse hitched in shafts. Fig. 2 is a longitudinal sectional view with the horse out of the way. Fig. 3 shows the canopy as closed and thrown back. Fig. 4 shows the canopy as fully distended and adjusted backward, and Fig. 5 is a detail sectional view through the shaft and its immediately-connected parts in the plane of the headed bolt pivoting the canopy to the shaft.

Like figures of reference designate like parts or features, as the case may be, wherever they occur.

In the drawings, 5 designates the shafts of a vehicle, to the sides of which irons 6 for the support of the canopy are secured. At about a central point longitudinally of the said irons 6 they are provided with an eye 7 to receive a headed bolt 8 for pivoting the converging ends of the bow-irons 9, three in number, one, 10, extending in a hem of the rear edge of the canopy from the pivoting-point on a shaft on one side rearwardly over the horse and forwardly on the other side to the other pivoting-point. Another bow 11 extends from the pivoting-point on one side to the pivoting-point on the other side, at the top stretching out so as to cover the head of the horse. The third bow 12 is arranged intermediate of the other two from one pivoting-point to the other over the back of the horse.

Near the lower ends of the middle bow 12 there are four straps 13, 14, 15, and 16, of iron, pivotally connected in the nature of toggle-levers. The outer straps 13 and 14 at their outer or lower ends are pivotally connected with the outer bows 10 and 11, and the two inner straps 15 and 16 at their point of meeting with the upper ends of the outer straps are connected with the latter by a simple pivot at each meeting-point. The said inner straps 15 and 16 are pivotally connected and beside are connected by a thumb-screw or equivalent device with the center bow 12 by means of a slot extending vertically through the said center bow, so that when the bows are separated as far as possible to distend the canopy the thumb-screw may be loosened and the point of connection of the inner ends of the central straps of the toggle-levers, with the central bow 12 raised, since the operation last mentioned will tend to straighten the last-mentioned straps, so that they will come nearer to extending in the same horizontal plane. When the canopy is distended and the toggle-levers are brought into proper position accordingly, the thumb-screw will be tightened, and so hold the canopy in its distended position. Should it be desired to close the canopy, the thumb-screw 17 will be loosened, and by bringing the bows together the pivotal connection of the toggle-levers with the center bow will be lowered and fixed so that the canopy can be laid fully back out of the way. (See Fig. 3.)

Jointed straps 18 on each side are pivotally connected at their lower ends with the rear ends of the side irons 6, and at their upper ends they have a like connection with the rear bow. This provision keeps the canopy from tipping forward farther than is necessary to make it cover the head of the horse, as shown in Fig. 1, and yet by breaking the joint of the levers 18 inward the canopy can be tipped back in either distended or closed position, so as to rest on the rearward portion of the shafts.

The manner in which the bows come together or converge at their lower ends and are there pivotally connected is shown quite clearly in Fig. 4.

The toggle-levers at the sides are simple in construction and arrangement and are readily and easily manipulated, though they perform important functions in the invention, as may be gathered from the description of the same.

The material composing the canopy may be a fabric of any kind suited to the purpose—as, for mere example, gloria-cloth, which is sometimes used as umbrella-coverings, or material even less expensive—and the metallic parts may be composed of iron or steel or other suitable metal.

The manner of using the invention and its offices, it is believed, have been sufficiently described in the foregoing so as to be sufficiently well understood by those skilled in the art to make and use it. It is to be noted, however, that changes may be made in the form and arrangement of parts within the limits of mechanical skill without departing from the general nature or spirit of the invention.

What is claimed as the invention is—

1. In a horse-canopy, the combination with the shafts and supporting-irons secured to the shafts, of folding bows for supporting the canopy and secured thereto and having their ends converged at a single point on the shaft-irons to which they are pivoted, and toggle-levers having a pivotal connection with the bows above their pivotal connection with the shaft-irons.

2. In a horse-canopy, the combination with the shafts, and supporting-irons secured to the shafts, of three folding bows for supporting the canopy and secured thereto and having their ends converged at a single point on the shaft-irons to which they are pivoted, and a jointed rod on each side pivotally connected at one end to the rear bow and at its other end to the shaft-iron.

3. In a horse-canopy, the combination with the shafts, three bows, the canopy-cloth, the front and rear bows being secured in the hem of the cloth, and the central bow extending beneath the same, with shaft-irons, the ends of the bows being arranged in converging order on the shaft-irons upon which they are also pivoted, toggle-levers connected with the bows above their pivotal point and having adjustable connection with the central bow, whereby the canopy can be folded or distended.

In testimony whereof I affix my signature in presence of two witnesses.

GEORGE H. TAYLOR.

Witnesses:
ARTHUR A. JOSEPH,
FREDRICKE JAMES.